United States Patent
Tsunoda et al.

(10) Patent No.: US 10,464,509 B2
(45) Date of Patent: Nov. 5, 2019

(54) ELECTRICAL EQUIPMENT MODULE

(71) Applicant: Yazaki Corporation, Tokyo (JP)

(72) Inventors: Mitsunori Tsunoda, Shizuoka (JP); Syuji Kimura, Shizuoka (JP); Gaku Itou, Shizuoka (JP); Shoichi Nomura, Shizuoka (JP); Taku Furuta, Shizuoka (JP); Naoya Yamashita, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 310 days.

(21) Appl. No.: 15/448,197

(22) Filed: Mar. 2, 2017

(65) Prior Publication Data

US 2017/0253200 A1  Sep. 7, 2017

(30) Foreign Application Priority Data

Mar. 4, 2016 (JP) .................................. 2016-042328

(51) Int. Cl.
  *B60R 16/03* (2006.01)
  *B62D 25/14* (2006.01)
(52) U.S. Cl.
  CPC .............. *B60R 16/03* (2013.01); *B62D 25/14* (2013.01)
(58) Field of Classification Search
  None
  See application file for complete search history.

(56) References Cited

U.S. PATENT DOCUMENTS

| | | | |
|---|---|---|---|
| 4,815,984 A | 3/1989 | Sugiyama et al. | |
| 5,549,344 A * | 8/1996 | Nishijima | ............ B60H 1/0055 180/90 |
| 5,811,732 A | 9/1998 | Beam | |
| 5,841,070 A | 11/1998 | Takiguchi et al. | |
| 6,119,060 A * | 9/2000 | Takayama | .............. B60K 35/00 307/9.1 |
| 6,249,425 B1 * | 6/2001 | Sudo | ................... B60R 16/0315 174/72 A |
| 6,474,716 B2 | 11/2002 | Shikata et al. | |

(Continued)

FOREIGN PATENT DOCUMENTS

| | | |
|---|---|---|
| CN | 1374913 A | 10/2002 |
| CN | 203032575 U | 7/2013 |

(Continued)

OTHER PUBLICATIONS

Japanese Office Action for the related Japanese Patent Application No. 2016-042328 dated Mar. 27, 2018.

(Continued)

*Primary Examiner* — Jared Fureman
*Assistant Examiner* — Joel Barnett
(74) *Attorney, Agent, or Firm* — Kenealy Vaidya LLP

(57) ABSTRACT

An electrical equipment module includes a main line module that includes a main line routing body that is mounted on a vehicle and is routed along a width direction extending member in a vehicle width direction of the vehicle, a branch portion that is interposed in the main line routing body, and a branch portion retaining member that extends along the width direction extending member and retains the branch portion; and a sub module that is connected to the main line module through the branch portion and is subjected to power supply distribution through the main line routing body.

18 Claims, 6 Drawing Sheets

(56) References Cited

U.S. PATENT DOCUMENTS

| | | | |
|---|---|---|---|
| 6,641,195 B2 * | 11/2003 | Shikata | B60H 1/00535 |
| | | | 180/90 |
| 6,685,259 B1 | 2/2004 | Shimase et al. | |
| 6,692,261 B2 * | 2/2004 | Matsuda | B60H 1/00535 |
| | | | 439/34 |
| 9,457,741 B2 | 10/2016 | Sasaki et al. | |
| 2001/0003404 A1 | 6/2001 | Shikata et al. | |
| 2003/0094831 A1 | 5/2003 | Kondo et al. | |
| 2015/0360627 A1 | 12/2015 | Sasaki et al. | |

FOREIGN PATENT DOCUMENTS

| | | |
|---|---|---|
| CN | 105322316 A | 2/2016 |
| JP | 63-125310 U | 8/1988 |
| JP | 9-301096 A | 11/1997 |
| JP | 2001-165355 A | 6/2001 |
| JP | 2001-177956 A | 6/2001 |
| JP | 2003-146150 A | 5/2003 |
| JP | 2003-304622 A | 10/2003 |
| JP | 2004-273369 A | 9/2004 |
| JP | 2005-277913 A | 10/2005 |
| JP | 2006-044587 A | 2/2006 |

OTHER PUBLICATIONS

Chinese Office Action for the related Chinese Patent Application No. 201710120449.5 dated Apr. 10, 2018 (with English machine Translation).

* cited by examiner

ELECTRICAL EQUIPMENT MODULE

CROSS-REFERENCE TO RELATED APPLICATION(S)

The present application claims priority to and incorporates by reference the entire contents of Japanese Patent Application No. 2016-042328 filed in Japan on Mar. 4, 2016.

BACKGROUND OF THE INVENTION

1. Field of the Invention

The present invention relates to an electrical equipment module.

2. Description of the Related Art

For example, in Japanese Patent Application Laid-open No. 2003-146150, an instrument panel wire harness device that includes: an instrument panel wire harness which is disposed in an instrument panel and includes a standard circuit and a branch connecting unit not affecting a vehicle grade and a variation; and a plurality of sub modules including a branch harness which is connected to the instrument panel wire harness, is routed according to the vehicle grade and the variation, and is completely routed, is disclosed as an electrical equipment module of the related art which is applied to a vehicle.

However, the instrument panel wire harness device disclosed in Japanese Patent Application Laid-open No. 2003-146150 described above, for example, has room for further improvement from the viewpoint of improving mountability.

SUMMARY OF THE INVENTION

The present invention has been made in consideration of the circumstances described above, and an object of the present invention is to provide an electrical equipment module which is capable of improving mountability into vehicles.

In order to achieve the above mentioned object, an electrical equipment module according to one aspect of the present invention includes a main line module that includes a main line routing body that is mounted on a vehicle and is routed along a width direction extending member in a vehicle width direction of the vehicle, a branch portion that is interposed in the main line routing body, and a branch portion retaining member that extends along the width direction extending member and retains the branch portion; and a sub module that is connected to the main line module through the branch portion and is subjected to power supply distribution through the main line routing body.

According to another aspect of the present invention, in the electrical equipment module, it is possible to configure that the sub module is assembled in the branch portion and the branch portion retaining member.

According to still another aspect of the present invention, in the electrical equipment module, it is possible to configure that the main line module includes a main line accommodating space portion that is partitioned by the width direction extending member and the branch portion retaining member and contains the main line routing body and the branch portion.

According to still another aspect of the present invention, in the electrical equipment module, it is possible to configure that the main line module includes a duct accommodating space portion that is partitioned into the width direction extending member and contains an air conditioning duct having an inner portion formed into a hollow shape through which air is capable of being circulated.

According to still another aspect of the present invention, in the electrical equipment module, it is possible to further include that a communication control connector that connects the branch portion to the sub module, wherein the main line module includes a control function unit that is connected to the main line routing body and controls power supply distribution to the sub module and communication with the sub module, and the communication control connector performs communication between the sub module and the control function unit and control of an instrument provided in the sub module.

According to still another aspect of the present invention, in the electrical equipment module, it is possible to configure that the main line module is included in an instrument panel of the vehicle.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment according to the present invention will be described in detail with reference to the drawings. The present invention is not limited by the embodiment. The constituents of the embodiment described below include a constituent which can be easily substituted by a person skilled in the art or a substantially the same constituent.

Embodiment

Figure 1:
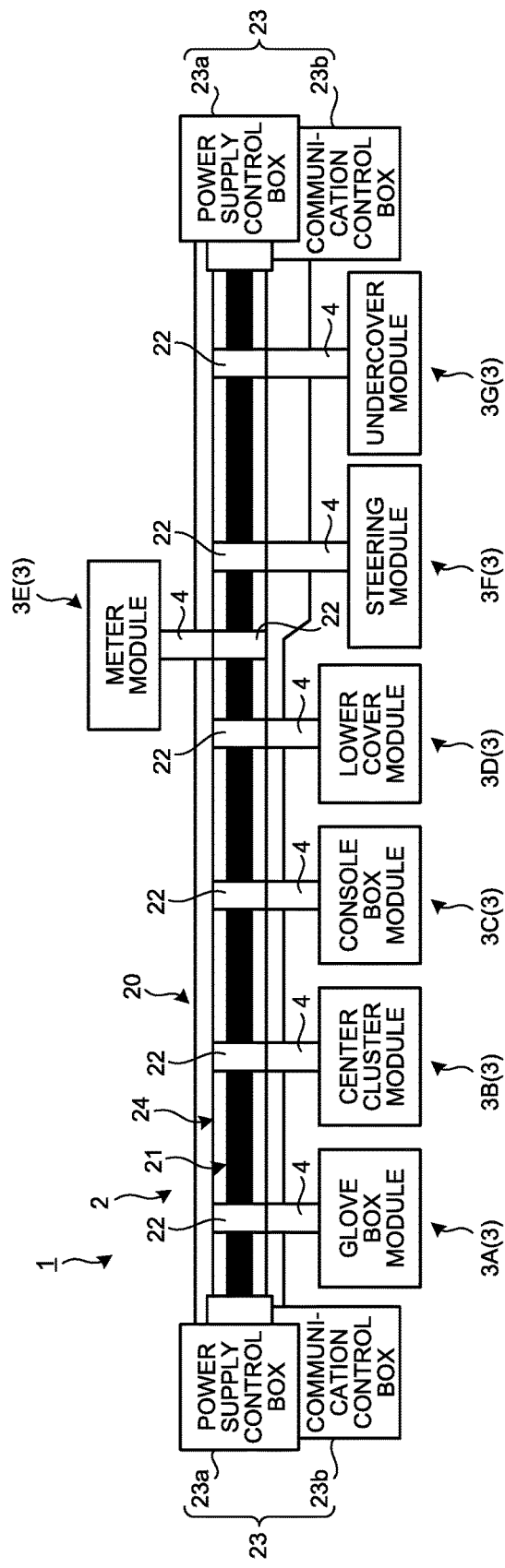
FIG. 1 is a block diagram illustrating a schematic configuration of an electrical equipment module according to an embodiment.
Figure 2:
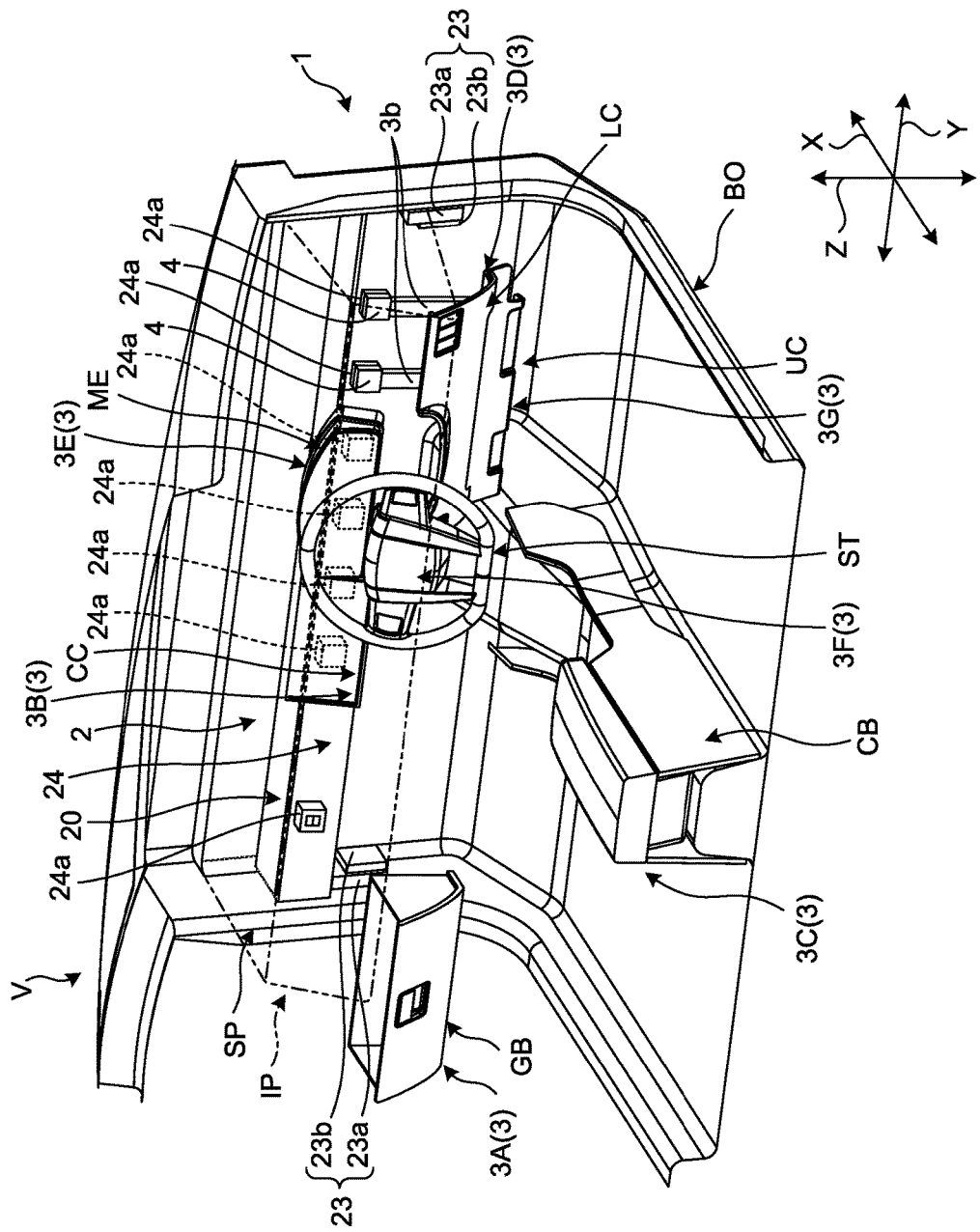
FIG. 2 is a partially exploded perspective view of the interior of a vehicle to which the electrical equipment module according to the embodiment is applied.
Figure 3:
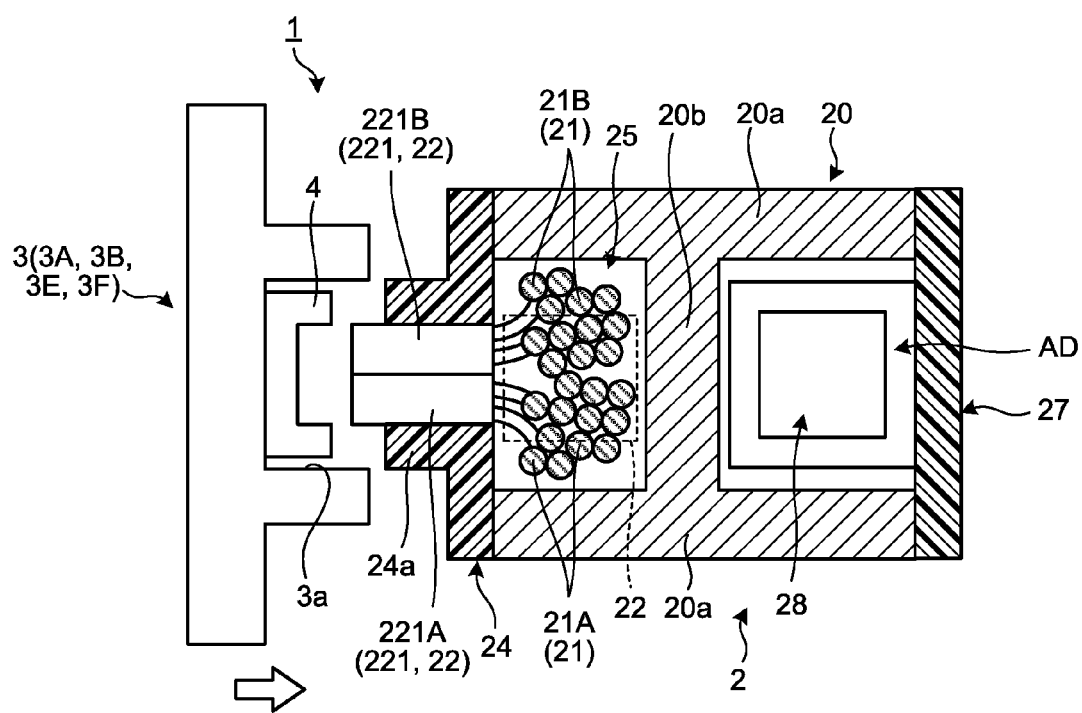
FIG. 3 is a schematic sectional view illustrating a schematic configuration of a main line module of the electrical equipment module according to the embodiment.
Figure 4:
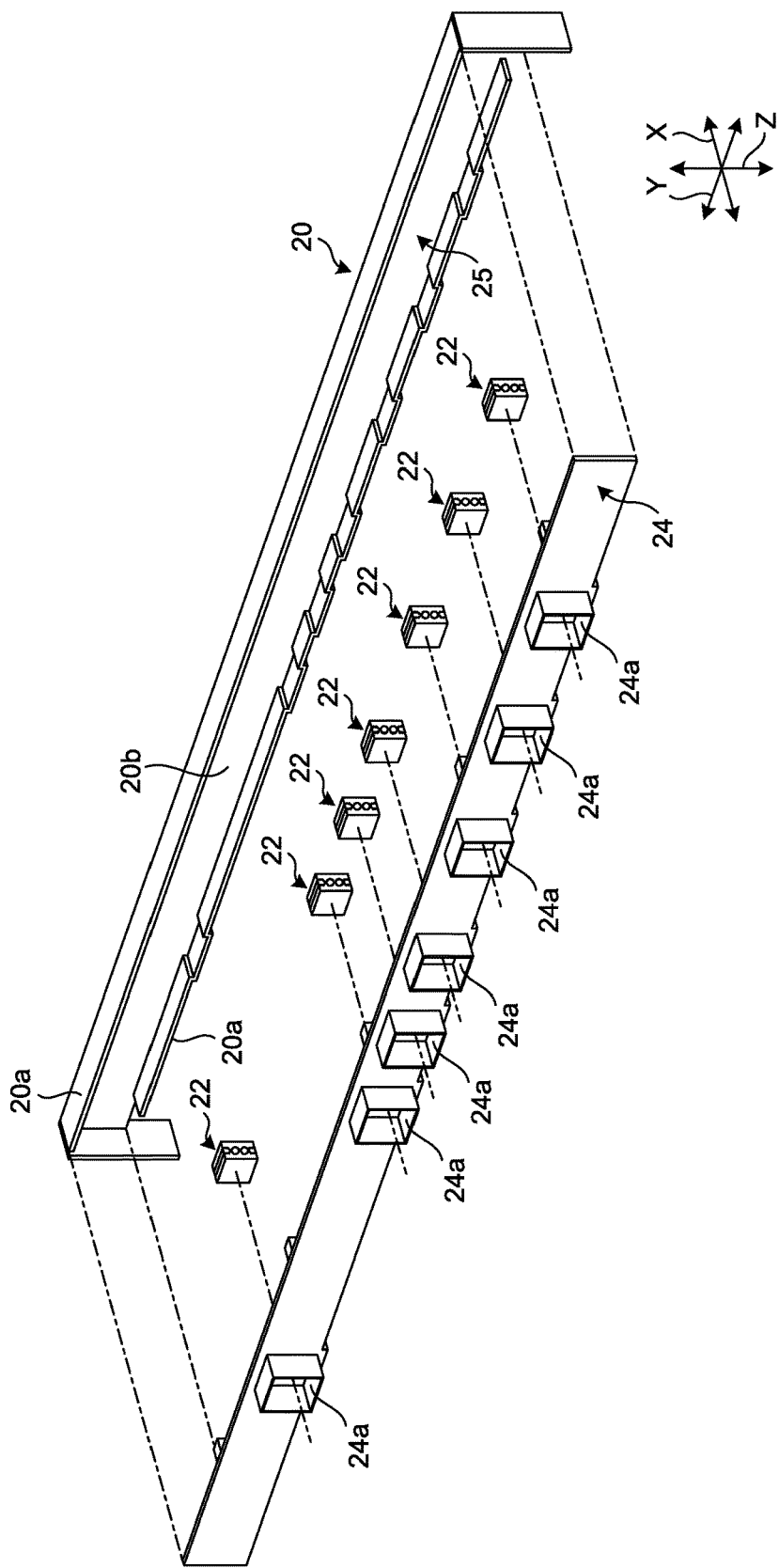
FIG. 4 is a schematic exploded perspective view illustrating a width direction extending member and a retaining plate of the main line module of the electrical equipment module according to the embodiment.
Figure 5:
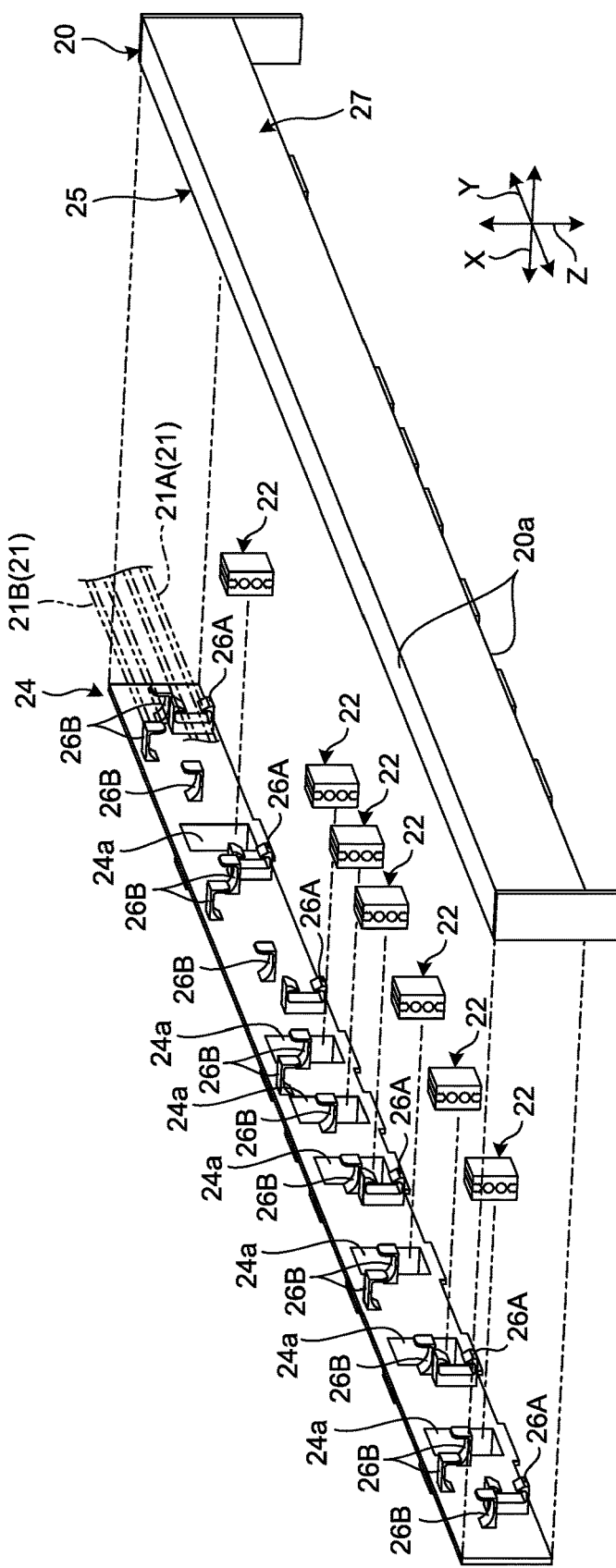
FIG. 5 is a schematic exploded perspective view illustrating the width direction extending member and the retaining plate of the main line module of the electrical equipment module according to the embodiment.
Figure 6:
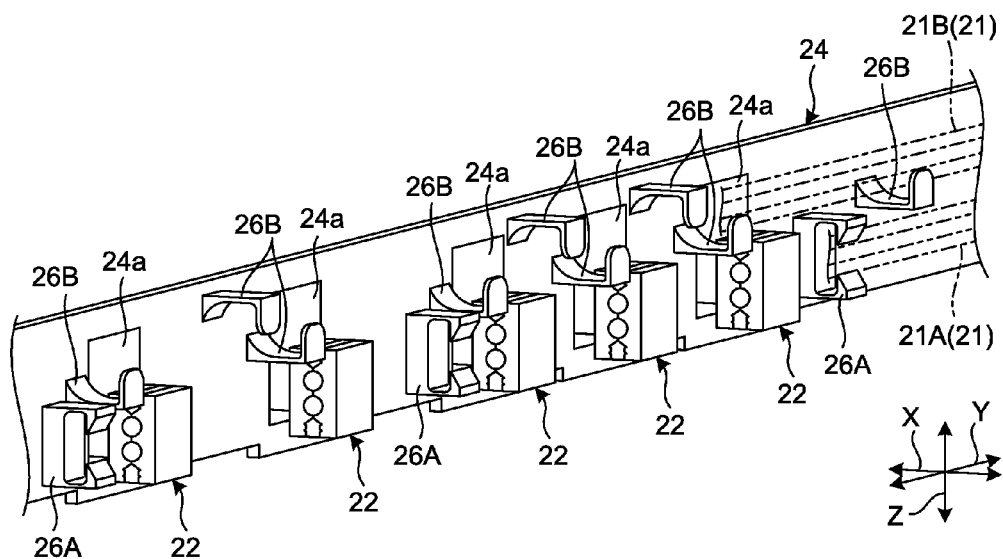
FIG. 6 is a schematic partially exploded perspective view illustrating the retaining plate of the main line module of the electrical equipment module according to the embodiment viewed from the main line accommodating space portion side.
Figure 7:
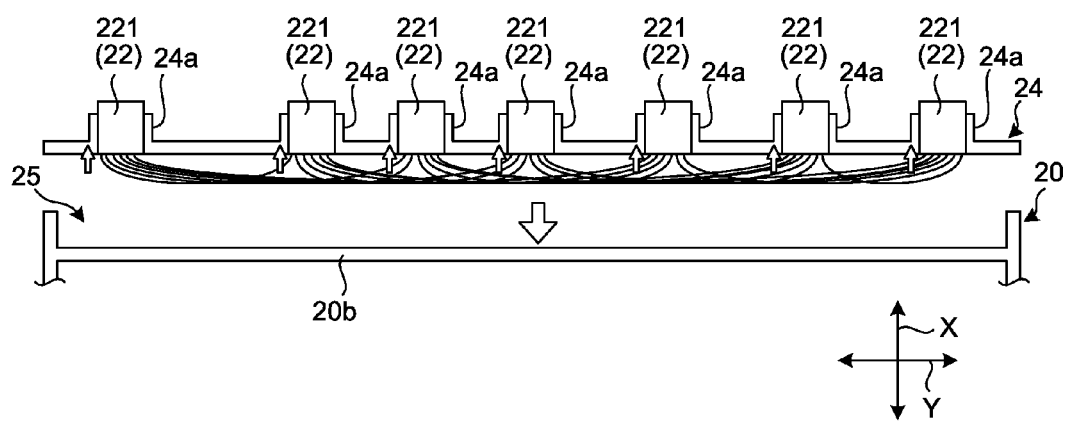
FIG. 7 is a schematic view illustrating fixation of the retaining plate of the main line module of the electrical equipment module according to the embodiment.

FIG. 1 is a block diagram illustrating a schematic configuration of an electrical equipment module according to an embodiment. FIG. 2 is a partially exploded perspective view of the interior of a vehicle to which the electrical equipment module according to the embodiment is applied. FIG. 3 is a schematic sectional view illustrating a schematic configuration of a main line module of the electrical equipment module according to the embodiment. FIG. 4 and FIG. 5 are schematic exploded perspective views illustrating a width direction extending member and a retaining plate of the main line module of the electrical equipment module according to the embodiment. FIG. 6 is a schematic partially exploded perspective view illustrating the retaining plate of the main line module of the electrical equipment module according to the embodiment viewed from the main line accommodating space portion side. FIG. 7 is a schematic view illustrating fixation of the retaining plate of the main line module of the electrical equipment module according to the embodiment. In FIG. 2, an instrument panel is illustrated by an alternate long and two short dashes line in order to easily understand the main line module of the electrical equipment module and a part thereof is simplified. In FIG. 4, a main line routing body, a standby connector, and the like are not illustrated. Similarly, in FIG. 5 and FIG. 6, the standby connector and the like are not illustrated, and a part of the main line routing body is simply illustrated by an alternate long and two short dashes line.

An electrical equipment module 1 of this embodiment illustrated in FIG. 1 and FIG. 2 is applied to a vehicle V, and is a wire harness module which is used for power supply or signal communication by connecting each of devices to be mounted on the vehicle V. The electrical equipment module 1 of this embodiment, typically, is an instrument panel module in which a main line module 2 described below is disposed in an instrument panel IP of the vehicle V along a vehicle width direction Y. The instrument panel IP is a member which is disposed on a vehicle interior side of the vehicle V and on a front side in a vehicle longitudinal direction X along the vehicle width direction Y, that is, the electrical equipment module 1 as the instrument panel module is a structural module in which the main line module 2 is disposed on the vehicle interior side of the vehicle V and on the front side in the vehicle longitudinal direction X along the vehicle width direction Y. More specifically, in the electrical equipment module 1, the main line module 2 is disposed in an accommodating space portion SP partitioned by a wall surface on the front side of a body BO of the vehicle V in the vehicle longitudinal direction X and the instrument panel IP.

Here, in the vehicle V to which the electrical equipment module 1 is applied, the "vehicle longitudinal direction X", typically, corresponds to a whole length direction of the vehicle V, in other words, corresponds to a direction according to a longitudinal straight-ahead direction of the vehicle V. The "vehicle width direction Y", typically, corresponds to a whole width direction of the vehicle V, and corresponds to a vehicle right-left direction of the vehicle V. A "vehicle height direction Z", typically, corresponds to a vehicle height direction of the vehicle V. The vehicle longitudinal direction X which is a first direction, the vehicle width direction Y which is a second direction, and the vehicle height direction Z which is a third direction are orthogonal to each other, and in a state where the vehicle V is positioned on a horizontal surface, the vehicle longitudinal direction X and the vehicle width direction Y are along a horizontal direction, and the vehicle height direction Z is along a vertical direction. In the following description, there is a case where a side in which the vehicle V moves forward is referred to as the "front", and a side in which the vehicle V moves backward is referred to as the "back", in the vehicle longitudinal direction X. There is a case where a left side (a left side in FIG. 2) towards the front in the vehicle longitudinal direction X is referred to as a "left side", and a right side (a right side in FIG. 2) towards the front in the vehicle longitudinal direction X is referred to as a "right side", in the vehicle width direction Y. There is a case where the upper side in the vertical direction is referred to as an "upper side", and the lower side in the vertical direction is referred to as a "lower side", in the vehicle height direction Z. Unless otherwise particularly stated, each of the directions used in the following description indicates a direction in which units are assembled to each other.

The electrical equipment module 1 of this embodiment connects various sub modules 3 to the main line module 2 extending along the vehicle width direction Y in the instrument panel IP, and thus, mountability with respect to the vehicle V are improved. Hereinafter, the configuration of the electrical equipment module 1 will be described in detail with reference to each of the drawings.

Specifically, the electrical equipment module 1 includes the main line module 2, the sub module 3, and a communication control connector 4.

In the instrument panel IP, more specifically in the accommodating space portion SP, the main line module 2 is an instrument panel interior structure module extending along the vehicle width direction Y, and the sub module 3 described below is connected thereto. The main line module 2 includes a main line routing body 21, a branch box 22 as a branch portion, a control function unit 23, and a retaining plate 24 as a branch portion retaining member, a main line is configured by routing the main line routing body 21 along a width direction extending member 20 through the branch box 22. The main line module 2 may be modularized by including the width direction extending member 20 itself, and may be modularized not including the width direction extending member 20.

The width direction extending member 20 is mounted on the vehicle V, and is a member extending along the vehicle width direction Y in the instrument panel IP, more specifically in the accommodating space portion SP. The width direction extending member 20 of this embodiment is a structural strength member, a so-called reinforcement, which extends along the vehicle width direction Y in the instrument panel IP and supports a steering ST on the body BO. The reinforcement configuring the width direction extending member 20 may be a metal material, or may be a resin material having high rigidity. Here, the reinforcement configuring the width direction extending member 20 is formed of a metal material to have an approximately H-shaped sectional shape (the more specific shape will be described in detail in FIG. 3 described below). In the width direction extending member 20, both end portions in the vehicle width direction Y are fixed to the body BO. The width direction extending member 20 extends to an end on the left side from an end on the right side along the vehicle width direction Y in the instrument panel IP, in a state of being fixed to the body BO.

The main line routing body 21 is a main line routing body which is routed along the width direction extending member 20. Here, the main line routing body 21 is routed along the vehicle width direction Y in a main line accommodating space portion 25 (refer to FIG. 3 described below) which is partitioned between the width direction extending member 20 and the retaining plate 24 described below. The main line routing body 21 is configured by bundling up a plurality of electric wires configuring a power line for power supply, a communication line for signal communication, a ground wire for grounding, and the like. The electric wire configuring the main line routing body 21, for example, is configured by including a conductor portion (a core wire) in which a plurality of conductive metal strands are twisted, and an insulating covering portion which covers the outside of the conductor portion. The main line routing body 21 may include a cable for optical communication.

The branch box 22 is a portion which is interposed in the main line routing body 21 and allows a circuit configured of the main line routing body 21 to branch, and is a connecting portion to which the sub module 3 described below is electrically connected (optically connected as necessary (hereinafter, "optically connected as necessary" similarly applies to the same description) in the main line module 2. The branch box 22 distributes power electricity, a signal, and the like which are transmitted through the main line routing body 21 to each of the sub modules 3. The branch box 22 may be configured by including a circuit protective unit such as a fuse which protects an electric circuit of each of the sub modules 3 from a high current of greater than or equal to a rated current. The branch box 22 may be configured by including a standby connector 221 described below (refer to FIG. 3 described below) which is a portion for being connected to the sub module 3 and the like in each branch box 22. A plurality of branch boxes 22, here, seven branch boxes 22 are disposed in the main line routing body 21 according to the number of sub modules 3 described below. Typically, it is preferable that the main line routing body 21 which is routed to connect the respective branch boxes 22 to each other is configured as a linear object which is electrically connected to each of the branch boxes 22 through a connecting unit such as a connector, and does not include a branch in itself.

The control function unit 23 is connected to the main line routing body 21, and controls power distribution to the sub module 3 and communication with the sub module 3. The control function unit 23 is electrically connected to each of both ends of the main line routing body 21 in the vehicle width direction Y. Each control function unit 23 is connected to the main line routing body 21 through a connector or the like. Here, each of the control function units 23 is not limited to a configuration in which the control function units 23 respectively include a power supply control box 23a and a communication control box 23b, and for example, may have a structure in which the power supply control box 23a and the communication control box 23b are integrated. It is not necessary that the control function unit 23 is disposed on each of the both ends of the main line routing body 21, and the control function unit 23 may be disposed on only one end of the main line routing body 21.

Each power supply control box 23a is formed into a unit box in which a function of performing power supply distribution with respect to the sub module 3 connected to the main line module 2, a function of performing power supply control, and the like are integrated by an electronic function component built-in a housing. In other words, each of the power supply control boxes 23a can be configured by incorporating a function of a so-called electric connection box, which is referred to as a junction block, a fuse box, a relay box, and the like, distributing electricity supplied from the power supply to various instruments of each of the sub modules 3 connected to the main line module 2. Each of the power supply control boxes 23a may be formed into a unit box in which the power supply mounted on the vehicle V, for example, a power generator such as an alternator, a power backup function of performing battery backup, and the like are also integrated by the electronic function component built-in the housing. That is, each of the power supply control boxes 23a can be referred to as an electronic component unit in which various functions such as power supply distribution, control of each unit, power supply backup, and the like are aggregated. The electronic function component built-in each of the power supply control boxes 23a is various elements for exhibiting various functions described above, and is configured by including various function components. The electronic function components built-in each of the power supply control boxes 23a, for example, include at least one of a power supply distribution function component performing power supply distribution with respect to the sub module 3, a power supply control function component performing power supply control, and a power supply backup function component performing backup with respect to the power supply mounted on the vehicle V. The power supply distribution function component, for example, is a power supply control box or the like in which a relay, a fuse, a resistance, a transistor, and an intelligent power switch (IPS) are unitized. The power supply control function component, for example, is an electronic control unit including a microcomputer, ECU, and the like. In other words, the power supply backup function component is a distributed power supply function component, and for example, is a condenser, a capacitor, a secondary cell unit, a thin sheet type cell, and the like.

Each of the communication control boxes 23b is formed into a unit box in which a function of performing various communications with the sub module 3, a function of performing communication control, and the like are integrated by an electronic function component, an optical function component, and the like built-in the housing. Each of the communication control boxes 23b may be formed into a unit box in which a wireless communication function and the like in the vehicle V are also integrated by the electronic function component, the optical function component, and the like built-in the housing. That is, each of the communication control boxes 23b can be referred to as an electronic component unit in which various functions relevant to communication are aggregated. The electronic function component and the optical function component built-in each of the communication control boxes 23b are various elements for exhibiting various functions described above, and are configured by including various function components. The electronic function components and the optical function components built-in each of the communication control boxes 23b, for example, include at least one of a communication function component performing various communications, a communication control function component performing communication control, and a wireless communication function component performing wireless communication. The communication function component, for example, is various transmitter/receiver, and the like. The communication control function component, for example, is an electronic control unit including a microcomputer, ECU, and the like. The wireless communication function component, for example, is a transmitting/receiving unit, an antenna, and the like in various manners such as near field communication (NFC) such as a wireless LAN (W-LAN), Wi-Fi (Registered Trademark), and Bluetooth (Registered Trademark). The antenna, for example, may receive electronic toll collection (ETC), global positioning system (GPS), telephone (TEL), and vehicle information and communication system (VICS) (registered trademark) information, and the like.

As illustrated in FIG. 3, FIG. 4, FIG. 5, and FIG. 6, the retaining plate 24 is a member which extends along the width direction extending member 20 and retains the plurality of branch boxes 22. Here, the retaining plate 24 is formed approximately into the shape of a rectangular plate along the vehicle width direction Y, and the main line accommodating space portion 25 is formed between the retaining plate 24 and the width direction extending member 20 described above. Here, as described above, the reinforcement configuring the width direction extending member 20 is formed to have an approximately H-shaped sectional shape. More specifically, the width direction extending member 20 includes a pair of flat plate portions 20a and a joining portion 20b. Each of the pair of flat plate portions 20a is formed approximately into the shape of a rectangular plate in which the vehicle height direction Z becomes a plate thickness direction, and extends along the vehicle width direction Y. The pair of flat plate portions 20a is disposed at intervals along the vehicle height direction Z, is joined by a joining portion 20b approximately in the center portion of the vehicle longitudinal direction X. The joining portion 20b is formed approximately into the shape of a rectangular plate in which the vehicle longitudinal direction X becomes a plate thickness direction, extends along the vehicle width direction Y, and joins the pair of flat plate portions 20a. The width direction extending member 20 has approximately H-shape in which the pair of flat plate portions 20a and the joining portion 20b are integrated and both sides in the vehicle longitudinal direction X are opened. The retaining plate 24 is formed approximately into the shape of a rectangular plate in which the vehicle longitudinal direction X becomes a plate thickness direction, and extends along the vehicle width direction Y. Then, the retaining plate 24 is disposed to block the opening along the opening on the back side of the width direction extending member 20 in the vehicle longitudinal direction X, and is assembled in the width direction extending member 20 through various assembling mechanisms. Then, as described above, the main line accommodating space portion 25 is formed between the retaining plate 24 and the width direction extending member 20. The main line accommodating space portion 25 is a space portion containing the main line routing body 21 which is partitioned by the width direction extending member 20 and the retaining plate 24, and each of the branch boxes 22, and extends along the vehicle width direction Y. More specifically, the main line accommodating space portion 25 is a space portion which is partitioned by the pair of flat plate portions 20a and the joining portion 20b of the width direction extending member 20, and the retaining plate 24. The main line routing body 21 which is routed to and contained in the main line accommodating space portion 25 extends along the vehicle width direction Y.

Then, in the retaining plate 24, a retaining opening portion 24a (refer to FIG. 2 and the like) which exposes a part of each of the branch boxes 22 to the outside of the main line accommodating space portion 25 and retains the branch box 22 is formed. The retaining opening portion 24a is formed approximately into the shape of a rectangular tube by protruding to a side opposite to the main line accommodating space portion 25 along the vehicle longitudinal direction X, that is, on the back side. In the retaining opening portion 24a, a hollow inner portion penetrates through the retaining plate 24 in the vehicle longitudinal direction X, in other words, in the plate thickness direction. A plurality of retaining opening portions 24a, here, seven retaining opening portions 24a are disposed along the vehicle width direction Y according to the number of sub modules 3 described below. A part of each of the branch boxes 22 is fitted into each of the retaining opening portions 24a, and thus, the part of each of the branch boxes 22 is exposed to the outside of the main line accommodating space portion 25 (in particular, refer to FIG. 3 and the like). Here, each of the branch boxes 22 is configured by including a standby connector 221 which is a portion for being connected to sub module 3 in each of the branch boxes 22. Then, the standby connector 221 is fitted into each of the retaining opening portions 24a, and thus, the standby connector 221 is retained by being exposed to the outside of the main line accommodating space portion 25. The standby connector 221 retained in each of the retaining opening portions 24a forms a part of the branch box 22, and here, the standby connector 221 is a so-called self-fit connector, and is connector-fitted along with the assembling of the sub module 3.

Here, the main line routing body 21 which is contained in the main line accommodating space portion 25 configured as described above, for example, may be configured by including a standard main line routing body 21A used as a standard circuit regardless of the vehicle grade, the variation, and the like, and a non-standard main line routing body 21B as a non-standard circuit added according to the vehicle grade, the variation, and the like (refer to FIG. 3 and the like). In this case, it is preferable that the standard main line routing body 21A and the non-standard main line routing body 21B are zoned in the routed main line accommodating space portion 25 and are routed. For example, in examples of FIG. 3, FIG. 5, and FIG. 6, the standard main line routing bodies 21A are collectively routed on the lower side in the vehicle height direction Z by a standard line retaining unit 26A disposed in the main line accommodating space portion 25 and are retained in the main line accommodating space portion 25. On the other hand, the non-standard main line routing bodies 21B are collectively routed on an upper portion in the vehicle height direction Z by a non-standard line retaining unit 26B disposed in the main line accommodating space portion 25 and are retained in the main line accommodating space portion 25. The standard line retaining unit 26A and the non-standard line retaining unit 26B respectively have slightly different shapes, and are formed into the shape of a hook to protrude to the main line accommodating space portion 25 side from the surface of the retaining plate 24 on the main line accommodating space portion 25 side. A plurality of standard line retaining units 26A are disposed on the lower side in the vehicle height direction Z at intervals along the vehicle width direction Y in the main line accommodating space portion 25. On the other hand, A plurality of non-standard line retaining units 26B are disposed on the upper side in the vehicle height direction Z at intervals along the vehicle width direction Y in the main line accommodating space portion 25. Then, the standby connector 221 described above is also configured by including a standard standby connector 221A disposed with respect to the standard main line routing body 21A, and a non-standard standby connector 221B disposed with respect to the non-standard trunk routing body 21B. Here, one standard standby connector 221A and one non-standard standby connector 221B can be fitted into each of the retaining opening portion 24a and can be retained. The standard standby connector 221A and the non-standard standby connector 221B, for example, are retained along the vehicle height direction Z in two steps and are exposed to the outside of the main line accommodating space portion 25, in a state where each of the standard standby connector 221A and the non-standard standby connector 221B is fitted into the retaining opening portion 24a (in particular, refer to FIG. 3 and the like).

The standard main line routing body 21A and the non-standard main line routing body 21B configuring the main line routing body 21 are routed along the vehicle width direction Y in the main line accommodating space portion 25, and for example, may be fixed to the width direction extending member 20 through a fixing tool such as various clamps or clips. The standard main line routing body 21A and the non-standard main line routing body 21B configuring the main line routing body 21, for example, may be assembled in the width direction extending member 20 through a so-called noise grounding clamp or the like, which is capable of performing ground connection along with assembling. In the following description, in a case where it is not necessary to particularly distinctively describe the standard main line routing body 21A and the non-standard main line routing body 21B, the standard main line routing body 21A and the non-standard main line routing body 21B will be simply referred to as the main line routing body 21. Similarly, in a case where it is not necessary to particularly distinctively describe the standard standby connector 221A and the non-standard standby connector 221B, the standard standby connector 221A and the non-standard standby connector 221B will be simply referred to as the standby connector 221.

Here, as illustrated in FIG. 3 and FIG. 5, the main line module 2 of the embodiment includes a duct space partitioning plate 27. The duct space partitioning plate 27 is formed approximately into the shape of a rectangular plate in which the vehicle longitudinal direction X becomes a plate thickness direction, and extends along the vehicle width direction Y. Then, the duct space partitioning plate 27 is disposed to block the opening along the opening on the front side of the width direction extending member 20 in the vehicle longitudinal direction X, and is assembled in the width direction extending member 20 through various assembling mechanisms. A duct accommodating space portion 28 is formed between the duct space partitioning plate 27 and the width direction extending member 20. The duct accommodating space portion 28 is a space portion which is partitioned by the width direction extending member 20 and the duct space partitioning plate 27 and contains an air conditioning duct AD, and extends along the vehicle width direction Y. More specifically, the duct accommodating space portion 28 is a space portion which is partitioned by the pair of flat plate portions 20a and the joining portion 20b of the width direction extending member 20, and the duct space partitioning plate 27. The air conditioning duct AD is formed into a hollow shape, and thus, air can be circulated through an inner portion thereof. The air conditioning duct AD which is routed to and contained in the duct space partitioning plate 27 extends along the vehicle width direction Y. Accordingly, in the electrical equipment module 1 of this embodiment, the main line module 2, the width direction extending member 20, and the air conditioning duct AD can be unitized.

Returning to FIG. 1, FIG. 2, and FIG. 3, various instruments are electrically connected to the sub module 3 through a routing circuit body such as an electric wire and a bus bar, and the sub module 3 is modularized to be a circuit having a high density and a high efficiency according to a disposing area in the vehicle V. The sub module 3 is connected to the main line module 2 through the branch box 22, and is subjected to power supply distribution at least through the main line routing body 21. Typically, the sub module 3 is electrically connected to the branch box 22 of the main line module 2 through a connector (for example, the communication control connector 4 described below) and the like, and performs power supply or signal communication between various instruments and the control function unit 23 or the like through the main line routing body 21 or the like. The sub module 3 may perform a part of the signal communication by wireless communication in various manners through the wireless communication function component or the like of each of the communication control boxes 23b described above. The sub module 3 may be subjected to power supply by contactless power feeding in various manners. The sub module 3 may connect various instruments in the sub module 3 in a wired manner through a routing circuit body such as an electric wire and a bus bar, or may use wireless communication in various manners. A plurality of sub modules 3 are disposed. Here, seven sub modules 3 in total, which include a glove box module 3A, a center cluster module 3B, a console box module 3C, a lower cover module 3D, a meter module 3E, a steering module 3F, and an undercover module 3G, are disposed.

The glove box module 3A includes various instruments which are disposed in a glove box GB. The glove box GB is an openable container which is positioned on the front side of a passenger seat of the vehicle V in the vehicle longitudinal direction X. The glove box module 3A, for example, includes an illuminating device which is turned off in a state where the glove box GB is closed and is turned on in a state where the glove box GB is opened, and the like as the various instruments.

The center cluster module 3B includes various instruments which are disposed in a center cluster CC. The center cluster CC is a fixed container which is disposed approximately in the center of the instrument panel IP in the vehicle width direction Y. The center cluster module 3B, for example, includes various switches operating an audio, a multimedia, an air conditioning instrument or the like, a navigation device, and the like as the various instruments.

The console box module 3C includes various instruments which are disposed in a console box CB. The console box CB is an openable container which is positioned between a driver seat and the passenger seat in the vehicle V. The console box module 3C, for example, include a connection instrument with respect to an external instrument, such as a plug of 100 V, a socket of 12 V, a USB socket, and an HDMI (Registered Trademark) socket, a contactless power feeding instrument in various manners, which is capable of charging a carry-on terminal instrument such as a smart phone, a tablet, and a game instrument in a contactless manner, a transmitting/receiving unit in various manners, which is capable of performing wireless communication with respect to the carry-on terminal instrument, and the like as the various instruments.

The lower cover module 3D includes various instruments which are disposed in a lower cover LC. The lower cover LC is a cover member which covers the lower side of the instrument panel IP in the vehicle height direction Z on a right side in the vehicle width direction Y. The lower cover module 3D, for example, includes various switches such as a trunk opener, and the like as the various instruments.

The meter module 3E includes various instruments which are disposed in a meter ME. The meter ME is a display device which is positioned on the front side of the driver seat in the vehicle longitudinal direction X, in the instrument panel IP. The meter module 3E, for example, includes an analog instrument, an image display device, and the like, which display various information items relevant to the vehicle V, such as the speed of the vehicle V, an accumulated mileage, a cooling water temperature, an output rotating speed of a power source for traveling, a fuel residual amount, a battery storage amount, warning information (telltale), a shift position indicator, and information relevant to eco-traveling, as the various instruments.

The steering module 3F includes various instruments which are disposed in the steering ST. The steering module 3F, for example, includes various switches operating an audio, a multimedia, an air conditioning instrument, and the like, various sensors detecting a turning angle of the steering ST or the like, an airbag device, a horn device, and the like as the various instruments. For example, the steering module 3F performs signal communication with respect to an instrument configuring an operation system involved in the traveling of the vehicle V, such as various sensors or the like detecting the turning angle or the like of the steering ST or an instrument configuring a safety system such as an airbag device and a horn device in a wired manner through a connector (for example, the communication control connector 4 described below), the main line routing body 21, and the like between various instruments and the control function unit 23 or the like. On the other hand, the steering module 3F, for example, may perform signal communication by wireless communication in various manners with respect to an instrument not involved in the traveling or the safety of the vehicle V, such as various switches or the like operating an audio, a multimedia, an air conditioning instrument, and the like through the wireless communication function component of each of the communication control boxes 23b and the like. In this case, the steering module 3F may be subjected to power supply in a wired manner through a connector, the main line routing body 21, and the like between various instruments and the control function unit 23 or the like, or may be wirelessly subjected to power supply by contactless power feeding in various manners. The steering module 3F includes a wireless communication module and the like, and thus, performs all communications wirelessly, and in the power supply, for example, the steering module 3F itself includes various power generation units such as a piezoelectric element or a solar panel, or a secondary cell capable of storing a cell which generates power, and configures a power system independent from other modules, and thus, may have a clock-springless configuration not including a so-called clock spring (ribbon-like electric wiring) or the like.

The undercover module 3G includes various instruments which are disposed in an undercover UC. The undercover UC is a cover member which covers the opening of the lower cover LC formed on the lower side in the vehicle height direction Z. The undercover module 3G, for example, includes an illuminating device illuminating the floor, an on-board diagnostics (OBD) instrument, a connecting unit connecting software update terminal instruments of various instruments, and the like as the various instruments.

The communication control connector 4 is a connection function component which electrically connects the sub module 3 to the main line module 2. More specifically, the communication control connector 4 electrically connects the branch box 22 to the sub module 3, and performs communication between the sub module 3 and the control function unit 23, and the control of the instrument of the sub module 3. Here, the communication control connector 4 is configured as a connection function component connecting the standby connector 221 of the branch box 22 to the sub module 3, and is disposed in a connecting portion with respect to the standby connector 221 of the sub module 3.

The communication control connector 4 is configured by including a connection terminal for connecting the standby connector 221 of the branch box 22 to the sub module 3, a housing retaining the connection terminal, and the like, and the control function component such as an electronic control unit including a microcomputer for various controls and ECU is built-in the housing. The communication control connector 4 is capable of intercommunicating with each function component of the control function unit 23 by the control function component, and performs the communication between the sub module 3 and the control function unit 23, and the control of the instrument of the sub module 3.

Each of the sub modules 3 is connected to the branch box 22 through the communication control connector 4. For example, as illustrated in FIG. 2 and FIG. 3, the glove box module 3A, the center cluster module 3B, the meter module 3E, and the steering module 3F in the sub module 3 are directly coupled to the standby connector 221 in which the communication control connector 4 is retained and exposed in the retaining opening portion 24a of the retaining plate 24, and thus, are directly assembled in the standby connector 221 of the branch box 22, and the retaining opening portion 24a of the retaining plate 24. In this case, in the glove box module 3A, the center cluster module 3B, the meter module 3E, and the steering module 3F, for example, the communication control connector 4 is disposed in a fitting recessed portion 3a which is formed on an outer surface of each of the modules. In the outer surface of each of the modules, the fitting recessed portion 3a is formed on a surface facing the retaining opening portion 24a in the vehicle longitudinal direction X. Then, the glove box module 3A, the center cluster module 3B, the meter module 3E, and the steering module 3F are assembled in the retaining plate 24 in a positional relationship where the retaining opening portion 24a is fitted into the fitting recessed portion 3a, and the communication control connector 4 and the standby connector 221 are connector-fitted and connected to each other. Accordingly, in the glove box module 3A, the center cluster module 3B, the meter module 3E, and the steering module 3F, the assembling with respect to the retaining plate 24 and the connection between the standby connector 221 standing by in the retaining opening portion 24a of the retaining plate 24 and the communication control connector 4 are collectively performed by one working motion. On the other hand, as illustrated in FIG. 2, in the console box module 3C, the lower cover module 3D, and the undercover module 3G in the sub module 3, for example, the communication control connector 4 is disposed on the tip of an extension material 3b which forms a part of each of the modules and extends from each of the modules. The extension material 3b, for example, is an intermediate routing body which is configured of an electric wire configuring a power line for power supply, a communication line for signal communication, a ground wire for grounding, and the like, a bus bar, a cable for optical communication, and the like. Then, in the console box module 3C, the lower cover module 3D, and the undercover module 3G, the communication control connector 4 disposed on the tip of the extension material 3b is connected to the standby connector 221 standing by in the retaining opening portion 24a of the retaining plate 24. A connector corresponding to the communication control connector 4 may be disposed on the main line module 2 side of the electrical equipment module 1. That is, a communication control connector corresponding to the communication control connector 4, for example, may be disposed as the standby connector 221 by being changed to the communication control connector 4, and may be incorporated in the branch box 22.

The electrical equipment module 1 described above includes the main line module 2 and the sub module 3. The main line module 2 includes the main line routing body 21 which is mounted on the vehicle V and is routed along the width direction extending member 20 according to the vehicle width direction Y of the vehicle V, the branch box 22 interposed in the main line routing body 21, and the retaining plate 24 which extends along the width direction extending member 20 and retains the branch box 22. The sub module 3 is connected to the main line module 2 through the branch box 22 and is subjected to the power supply distribution through the main line routing body 21.

Therefore, in the electrical equipment module 1, the main line module 2 is configured by routing the main line routing body 21 along the width direction extending member 20 through the branch box 22, and the sub module 3 is connected to the main line module 2 through the branch box 22. In this case, the electrical equipment module 1 has a configuration where the branch box 22 to which the sub module 3 is connected, here, the standby connector 221 of the branch box 22 can be retained by the retaining plate 24 extending along the width direction extending member 20, and the position thereof can be fixed in the main line module 2, and thus, it is possible to improve workability at the time of assembling the main line module 2 and the sub module 3 in the vehicle V and of connecting the main line module 2 and the sub module 3 to each other. As a result thereof, in the electrical equipment module 1, for example, it is possible to make assembling work efficient by reducing the work relevant to the routing of the main line routing body 21, the connection of the sub module 3, or the like, and to improve the mountability with respect to the vehicle V. The electrical equipment module 1 is configured as a linear object in which the main line routing body 21 configuring the main line module 2 interposes the branch box 22 therein without having a branch in the main line routing body 21 itself, and thus, has a more compact and space-saving configuration by simplifying the shape of the main line module 2. Therefore, it is possible to improve the workability at the time of performing the assembling, to suppress the number of configuration components, or the like, and it is possible to improve a manufacturing efficiency. In other words, in the electrical equipment module 1, the branch between the main line module 2 and the instrument of each of the sub modules 3 is aggregated with each of the branch boxes 22 interposed in the main line routing body 21, and thus, the entire shape of the electrical equipment module 1 is simplified. Therefore, it is possible to improve the workability at the time of performing the assembling, to suppress the number of configuration components, or the like, and thus, for example, it is possible to simplify the work of handling or arranging various routing bodies, and to improve the mountability with respect to the vehicle V.

Here, as illustrated in FIG. 7 and the like, the electrical equipment module 1 is capable of sharing the retaining plate 24 which retains the standby connector 221 of the branch box 22 described above and fixes the position thereof as a so-called rod holding jig. In this case, a worker or the like, for example, changes the main line routing body 21 including the standby connector 221 on the end portion to a known dedicated rod holding jig, retains and fixes the rod holding jig by fitting each standby connector 221 into the retaining opening portion 24a disposed on the retaining plate 24 while hanging the rod holding jig on each standard line retaining unit 26A (refer to FIG. 5, FIG. 6, and the like) each non-standard line retaining unit 26B (refer to FIG. 5, FIG. 6, and the like) which are disposed on the retaining plate 24, and thus, sets the main line routing body 21 or the like to be in a so-called rod holding state. Then, the worker or the like assembles the retaining plate 24 on the surface of the width direction extending member 20 on the main line accommodating space portion 25 side while directly containing the main line routing body 21 in a state of being rod-held in the retaining plate 24 which is shared as the rod holding jig, in the main line accommodating space portion 25 without being subjected to so-called tying work or the like along with the retaining plate 24, and thus, performs the assembling of the main line module 2 with respect to the width direction extending member 20. As described above, the electrical equipment module 1 is capable of sharing the retaining plate 24 as a so-called rod holding jig, and thus, suppresses man-hour relevant to tying work or the like of a so-called routing body. Therefore, it is possible to easily assemble the main line module 2 in the vehicle V, and from this viewpoint, it is possible to improve the mountability with respect to the vehicle V.

According to the electrical equipment module 1 described above, the sub module 3 is assembled in the branch box 22 and the retaining plate 24. In this case, the electrical equipment module 1 is capable of directly coupling the sub module 3 to the branch box 22 and the retaining plate 24. More specifically, the electrical equipment module 1 is capable of collectively performing the assembling of the sub module 3 (for example, the glove box module 3A, the center cluster module 3B, the meter module 3E, and the steering module 3F) with respect to the retaining plate 24, and the connection between the standby connector 221 of the branch box 22, which stands by in the retaining opening portion 24a of the retaining plate 24, and the communication control connector 4. As a result thereof, the electrical equipment module 1, for example, is capable of performing connection work of the sub module 3 with respect to the branch box 22 of the main line module 2 in one action, and to improve connection workability.

According to the electrical equipment module 1 described above, the main line module 2 includes the main line routing body 21 which is partitioned by the width direction extending member 20 and the retaining plate 24, and the main line accommodating space portion 25 which contains the branch box 22. Therefore, in the electrical equipment module 1, the main line accommodating space portion 25 is partitioned by the width direction extending member 20 and the retaining plate 24, and thus, the main line accommodating space portion 25 can be ensured as a dedicated space for containing the main line routing body 21 and the branch box 22 in distinction from other spaces, and thus, it is possible to easily perform the work relevant to the routing of the main line routing body 21 or the disposing of the branch box 22.

According to the electrical equipment module 1 described above, the main line module 2 includes the duct accommodating space portion 28 which is partitioned into the width direction extending member 20 and contains the air conditioning duct AD having an inner portion formed into a hollow shape through which air can be circulated. Therefore, the electrical equipment module 1 is capable of unitizing the main line module 2, the width direction extending member 20, and the air conditioning duct AD, and thus, it is possible to collectively assemble the main line module 2, the width direction extending member 20, and the air conditioning duct AD in the vehicle V, and as a result thereof, it is possible to further improve the mountability of the vehicle V.

According to the electrical equipment module 1 described above, the communication control connector 4 connecting the branch box 22 to the sub module 3 is provided, the main line module 2 is connected to the main line routing body 21, the control function unit 23 controlling the power supply distribution to the sub module 3 and the communication with the sub module 3 is provided, and the communication control connector 4 performs the communication between the sub module 3 and the control function unit 23 and the control of the instrument of the sub module 3. Therefore, the electrical equipment module 1 is capable of integrally performing the communication between the sub module 3 and the control function unit 23 and the control of the instrument of the sub module 3 by the communication control connector 4 even in a case where the instrument of the sub module 3 is not individually connected to the control function unit 23 through the main line module 2, and thus, it is possible to further improve the mountability with respect to the vehicle V by further reducing the work relevant to the routing or the like.

According to the electrical equipment module 1 described above, the main line module 2 is disposed in the instrument panel IP of the vehicle V. Therefore, the electrical equipment module 1 is capable of improving the mountability with respect to the vehicle V in an instrument panel module in which the main line module 2 is disposed in the instrument panel IP of the vehicle V.

The electrical equipment module according to the embodiment of the present invention described above is not limited to the embodiment described above, but various changes can be performed within the scope of claims.

A vehicle to which the electrical equipment module 1 described above is applied may be a vehicle which is capable of realizing high functional automated driving in which a steering operation or the like of a driver is not required, as an example. In this case, the vehicle to which the electrical equipment module 1 is applied may be a reinforcementless vehicle not including a structural strength member which extends along the vehicle width direction Y in the instrument panel IP and support the steering ST on the body BO, a so-called reinforcement. In this case, the vehicle, for example, is in a so-called steer-by-wire manner where the steering ST is not mechanically connected to a steering wheel, and for example, the steering ST is supported on the floor of the body BO through a support arm or the like. The vehicle, for example, may have a configuration where the steering ST can be contained in a predetermined containing position along with various pedals at the time of performing automated driving or the like in which the operation of the driver is not required. Then, in this case, the width direction extending member may be the other member extending along the vehicle width direction Y in the instrument panel IP, for example, a structure which generally tends to be mounted in the instrument panel IP of the vehicle, and may be an air conditioning duct or the like formed into a hollow shape in which air can be circulated through an inner portion thereof, as an example. The width direction extending member may be a dedicated component which is configured separately from the air conditioning duct and is used for routing the main line routing body 21.

In the above description, the reinforcement configuring the width direction extending member 20 has been described as being formed to have an approximately H-shaped sectional shape, but is not limited thereto, and may have an approximately circular or rectangular sectional shape.

In the above description, the main line module 2 has been described as including the main line accommodating space portion 25 which is partitioned by the width direction extending member 20 and the retaining plate 24, and the duct accommodating space portion 28 which is partitioned by the width direction extending member 20 and the duct space partitioning plate 27, but is not limited thereto, and the main line routing body 21 and the air conditioning duct AD may be disposed on the outside of the width direction extending member 20.

In the above description, the retaining plate 24 has been described as being assembled in the width direction extending member 20, but is not limited thereto, and for example, may be assembled in the body BO.

In the above description, the connector connecting the standby connector 221 of the branch box 22 to the sub module 3 has been described as the communication control connector 4, but is not limited thereto, and may be a connector not having a function of performing the communication, a function of performing the control of the instrument of the sub module 3, and the like.

In the electrical equipment module 1 described above, the main line module 2 may be electrically connected to the other on-board module.

In the above description, it has been described that seven sub modules 3 in total, which include the glove box module 3A, the center cluster module 3B, the console box module 3C, the lower cover module 3D, the meter module 3E, the steering module 3F, and the undercover module 3G, are disposed, but the sub module 3 is not limited thereto.

The electrical equipment module 1 described above has been described as an instrument panel module which is disposed along the vehicle width direction Y in the instrument panel IP of the vehicle V, but is not limited thereto, and may be an on-board module which is disposed in the other position of the vehicle V.

In the electrical equipment module according to the present embodiment, the main line module is configured by routing the main line routing body along the width direction extending member through the branch portion, and the sub module is connected to the main line module through the branch portion. In this case, the electrical equipment module has a configuration where the branch portion to which the sub module is connected can be retained by the branch portion retaining member extending along the width direction extending member and the position thereof can be fixed in the main line module, and thus, it is possible to improve workability at the time of assembling the main line module and the sub module into the vehicle and of connecting the main line module and the sub module to each other. As a result thereof, the electrical equipment module has an effect such as enabling assembling work to be efficient by reducing the work relevant to the routing of the main line routing body, the connection of the sub module, or the like, and enabling the mountability with respect to the vehicle to be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electrical equipment module comprising:
a main line module that includes,
a width direction extending member,
a main line routing body that is mounted on a vehicle and is routed along the width direction extending member in a vehicle width direction of the vehicle, a branch portion that is interposed in the main line routing body, a branch portion retaining member that extends along the width direction extending member and retains the branch portion, and the branch portion retaining member includes a retaining opening portion, and a branch box mounted in a respective one of the retaining opening portions, and the branch portion terminates at and is connected to the branch box; and a sub module that is connected to the main line module through the branch portion and is subjected to power supply distribution through the main line routing body.

2. The electrical equipment module according to claim 1, wherein
the sub module is assembled in the branch portion and the branch portion retaining member.

3. The electrical equipment module according to claim 1, wherein
the main line module includes a main line accommodating space portion that is partitioned by the width direction extending member and the branch portion retaining member and contains the main line routing body and the branch portion.

4. The electrical equipment module according to claim 1, wherein
the main line module includes a duct accommodating space portion that is partitioned into the width direction extending member and contains an air conditioning duct having an inner portion formed into a hollow shape through which air is capable of being circulated.

5. The electrical equipment module according to claim 1, further comprising:
a communication control connector that connects the branch portion to the sub module, wherein
the main line module includes a control function unit that is connected to the main line routing body and controls power supply distribution to the sub module and communication with the sub module, and
the communication control connector performs communication between the sub module and the control function unit and control of an instrument provided in the sub module.

6. The electrical equipment module according to claim 1, wherein
the main line module is included in an instrument panel of the vehicle.

7. The electrical equipment module according to claim 2, wherein
the main line module includes a main line accommodating space portion that is partitioned by the width direction extending member and the branch portion retaining member and contains the main line routing body and the branch portion.

8. The electrical equipment module according to claim 2, wherein
the main line module includes a duct accommodating space portion that is partitioned into the width direction extending member and contains an air conditioning duct having an inner portion formed into a hollow shape through which air is capable of being circulated.

9. The electrical equipment module according to claim 3, wherein
the main line module includes a duct accommodating space portion that is partitioned into the width direction extending member and contains an air conditioning duct having an inner portion formed into a hollow shape through which air is capable of being circulated.

10. The electrical equipment module according to claim 2, further comprising:
a communication control connector that connects the branch portion to the sub module, wherein
the main line module includes a control function unit that is connected to the main line routing body and controls power supply distribution to the sub module and communication with the sub module, and
the communication control connector performs communication between the sub module and the control function unit and control of an instrument provided in the sub module.

11. The electrical equipment module according to claim 3, further comprising:
a communication control connector that connects the branch portion to the sub module, wherein
the main line module includes a control function unit that is connected to the main line routing body and controls power supply distribution to the sub module and communication with the sub module, and
the communication control connector performs communication between the sub module and the control function unit and control of an instrument provided in the sub module.

12. The electrical equipment module according to claim 4, further comprising:
a communication control connector that connects the branch portion to the sub module, wherein
the main line module includes a control function unit that is connected to the main line routing body and controls power supply distribution to the sub module and communication with the sub module, and
the communication control connector performs communication between the sub module and the control function unit and control of an instrument provided in the sub module.

13. The electrical equipment module according to claim 2, wherein
the main line module is included in an instrument panel of the vehicle.

14. The electrical equipment module according to claim 3, wherein
the main line module is included in an instrument panel of the vehicle.

15. The electrical equipment module according to claim 4, wherein
the main line module is included in an instrument panel of the vehicle.

16. The electrical equipment module according to claim 5, wherein
the main line module is included in an instrument panel of the vehicle.

17. The electrical equipment module according to claim 1, wherein
the width direction extending member is formed of a metal material and includes a pair of flat plate portions and a joining portion connected to and extending from each of the flat plate portions such that the width direction extending member has an H-shaped section shape and includes opening on either side of the joining portion, and
the branch portion retaining member extends along one of the openings of the width direction extending member.

18. The electrical equipment module according to claim 1, wherein the branch portion retaining member includes a plurality of hooks spaced along a surface of the branch portion retaining member and extending away from the surface, and the hooks support the main line routing body on the branch portion retaining member.

\* \* \* \* \*